(12) United States Patent
Ewert et al.

(10) Patent No.: US 10,711,639 B2
(45) Date of Patent: Jul. 14, 2020

(54) TURBOMACHINE

(71) Applicant: Mahle International GmbH, Stuttgart (DE)

(72) Inventors: Sebastian Ewert, Stuttgart (DE); Rolf Mueller, Steinheim/Murr (DE); Holger Oechslen, Stuttgart (DE); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 240 days.

(21) Appl. No.: 14/575,707

(22) Filed: Dec. 18, 2014

(65) Prior Publication Data

US 2015/0176428 A1 Jun. 25, 2015

(30) Foreign Application Priority Data

Dec. 19, 2013 (DE) .......................... 10 2013 226742

(51) Int. Cl.
| | | |
|---|---|---|
| *F01K 25/10* | (2006.01) | |
| *F01D 1/02* | (2006.01) | |
| *F01D 17/10* | (2006.01) | |
| *F01D 25/14* | (2006.01) | |
| *F01K 5/02* | (2006.01) | |
| *F01K 23/10* | (2006.01) | |
| *F01N 5/02* | (2006.01) | |
| *F01D 25/10* | (2006.01) | |
| *F01D 19/02* | (2006.01) | |

(52) U.S. Cl.
CPC ............. *F01D 25/10* (2013.01); *F01D 1/026* (2013.01); *F01D 17/105* (2013.01); *F01D 19/02* (2013.01); *F01D 25/14* (2013.01); *F01K 5/02* (2013.01); *F01K 23/101* (2013.01); *F01N 5/02* (2013.01); *F05D 2220/31* (2013.01); *F05D 2260/22141* (2013.01); *F05D 2260/606* (2013.01); *F05D 2260/85* (2013.01); *F05D 2270/303* (2013.01); *Y02T 50/675* (2013.01)

(58) Field of Classification Search
CPC ......... F05D 25/10; F01D 25/14; F01D 25/145
USPC ....................................................... 415/108
See application file for complete search history.

(56) References Cited

U.S. PATENT DOCUMENTS

| | | | | |
|---|---|---|---|---|
| 1,541,834 A | * | 6/1925 | Losel ...................... | F01D 25/10 |
| | | | | 415/108 |
| 1,896,508 A | * | 2/1933 | Brown .................... | F01D 25/10 |
| | | | | 122/58 R |

(Continued)

FOREIGN PATENT DOCUMENTS

| | | | | |
|---|---|---|---|---|
| CH | 429767 A | | 2/1967 | |
| CH | 670480 A5 | * | 6/1989 | ............. F01D 25/10 |

(Continued)

OTHER PUBLICATIONS

DE 102012222671 A1 English Translation.*

(Continued)

*Primary Examiner* — Mark A Laurenzi
*Assistant Examiner* — Jessica L Kebea
(74) *Attorney, Agent, or Firm* — Fishman Stewart PLLC

(57) ABSTRACT

A turbomachine may include a turbine arranged in a housing and configured to be acted on with a hot working medium. The turbomachine may include at least one bypass channel for heating the housing through the working medium. The bypass channel may extend completely within the housing and be configured to bypass the turbine.

14 Claims, 1 Drawing Sheet

(56) References Cited

U.S. PATENT DOCUMENTS

| | | | | |
|---|---|---|---|---|
| 2,377,611 | A * | 6/1945 | Caldwell | F01D 5/18 219/201 |
| 2,717,491 | A * | 9/1955 | Barr | F01K 23/103 60/39.17 |
| 3,139,927 | A * | 7/1964 | Binner | F28D 7/0041 165/159 |
| 3,267,564 | A * | 8/1966 | Keyes | B21C 1/22 138/140 |
| 4,300,353 | A * | 11/1981 | Ridgway | F01K 23/14 60/618 |
| 4,665,706 | A * | 5/1987 | Russell | F22B 35/105 60/646 |
| 4,684,321 | A * | 8/1987 | Barrett | F01D 1/023 415/143 |
| 4,699,566 | A * | 10/1987 | Miller | F01D 25/26 415/107 |
| 5,589,144 | A * | 12/1996 | Filippi | C23C 4/10 228/176 |
| 5,655,599 | A * | 8/1997 | Kasprzyk | F28F 1/40 165/133 |
| 5,692,372 | A * | 12/1997 | Whurr | F01C 1/22 60/226.1 |
| 6,070,657 | A * | 6/2000 | Kunkel | F24H 9/0026 165/158 |
| 8,662,823 | B2 * | 3/2014 | Roy | F01D 25/24 415/108 |
| 2004/0253100 | A1 * | 12/2004 | Blatchford | F01D 11/001 415/208.1 |
| 2005/0145380 | A1 * | 7/2005 | Usui | F28D 7/1607 165/177 |
| 2008/0163625 | A1 * | 7/2008 | O'Brien | F01K 25/08 60/651 |
| 2008/0216480 | A1 * | 9/2008 | Harmon | F01K 11/00 60/670 |
| 2013/0283790 | A1 | 10/2013 | Rewers et al. | |
| 2015/0033743 | A1 * | 2/2015 | Wada | F01C 20/26 60/670 |
| 2015/0033744 | A1 * | 2/2015 | Wada | F01C 20/26 60/670 |
| 2015/0354414 | A1 * | 12/2015 | Gibble | F01K 13/02 165/52 |
| 2017/0130633 | A1 * | 5/2017 | Andersson | F01N 5/02 |

FOREIGN PATENT DOCUMENTS

| | | | | |
|---|---|---|---|---|
| DE | 850616 | C * | 9/1952 | F01D 25/14 |
| DE | 102007016557 | A1 | 10/2008 | |
| DE | 102012222671 | A1 * | 6/2014 | F02G 5/02 |
| EP | 1939427 | A2 | 7/2008 | |
| EP | 2565419 | A1 | 3/2013 | |
| FR | 887534 | A * | 11/1943 | F01D 25/14 |
| FR | 1119425 | A * | 6/1956 | F01D 25/10 |
| GB | 301298 | A | 5/1929 | |
| GB | 813330 | A * | 5/1959 | F01D 9/06 |
| GB | 813330 | A | 5/1959 | |
| GB | 1059475 | A * | 2/1967 | F01D 25/10 |
| GB | 1059475 | A | 2/1967 | |
| JP | 2006017016 | A * | 1/2006 | |

OTHER PUBLICATIONS

DE 850616 C English Translation.*
FR 887534 A English Translation.*
JP-2006017016-A Ito (Pub Jan. 2006) English Translation (Year: 2012).*
English abstract for DE-102007016557.
English Abstract for EP 2565419.
Search Report for EP 14197570.6, dated May 8, 2015, 3 pp.
English Abstract EP-1939427-A2.
European Office Action, 14 197 570.6, dated Feb. 4, 2016.

* cited by examiner

TURBOMACHINE

CROSS-REFERENCE TO RELATED APPLICATIONS

This application claims priority to German Patent Application No. 10 2013 226 742.8, filed Dec. 19, 2013, the contents of which are hereby incorporated by reference in their entirety.

TECHNICAL FIELD

The present invention relates to a turbomachine which is designed as a turbine, according to the preamble of claim 1.

BACKGROUND

In a turbomachine, basically, an energy transfer between a flowing fluid, for example saturated vapor, and the turbomachine itself takes place. In a turbomachine designed as a turbine, the energy transfer is carried out, for example, by means of guide vanes which are profiled in such a manner that by the flow flowing around the guide vanes, a pressure difference between front and back sides occurs and thereby effects the rotation of the guide vanes. Turbines are normally composed of a rotating part, the so-called rotor, and a stationary part, the so-called stator. In the latter, the supply of the working medium to the rotor and a potentially required change of state of the working medium takes place before the medium is guided through the rotor. The working medium transfers a large portion of its energy to the rotor from where the energy is output via a shaft. The housing of the turbomachine normally assumes the function of leading the working medium to the stator as well as of discharging the working medium from the rotor out of the turbomachine.

In some operating states it is desired that the turbomachine, for example the turbine, is not to be acted on with working medium or with a lower mass flow than the available mass flow. In order to achieve this, so-called bypass channels are known from the prior art, which bypass the turbine of the turbomachine and branch off from a feed channel upstream of the turbine and end in said feed channel again downstream of the turbine. Such turbomachines are also used in connection with internal combustion engines in motor vehicles, for example for power generation, wherein in this case, they are integrated in a so-called Rankine cycle in which a working medium such as, e.g., water, ethanol or another organic medium or mixture of different media in liquid and vaporous aggregate states is used.

A method for utilizing waste heat from an internal combustion engine for generating electricity using such a Rankine cycle is known from DE 10 2007 016 557 A1, for example. Here, the working medium is first driven so as to form a circular flow, wherein, at the same time, heat is transferred from an exhaust gas flow of the internal combustion engine to the working medium. Thereby, the heat transfer effects evaporation of the working medium, wherein the saturated vapor, that is, the saturated vaporous working medium is subsequently fed to the expansion machine, thus to the turbine. In the expansion machine, the working medium is relaxed from its overheated state and thereby releases energy, and changes subsequently in a condenser into a liquid aggregate state. In liquid form, it is subsequently brought to a higher pressure level by a pump that is integrated in the Rankine cycle, and is evaporated in the exhaust gas heat exchanger integrated in the exhaust gas flow.

However, the disadvantage of the method known from the prior art is that in particular during a starting phase, it is not necessarily possible to prevent that the working fluid reaches the turbine in still liquid form and causes damage therein, for example by erosion due to droplet impingement.

SUMMARY

The present invention is therefore concerned with the problem of providing an improved embodiment for a turbomachine of the generic kind, which overcomes in particular the disadvantage known from the prior art.

This problem is solved according to the invention by the subject matters of the independent claims. Advantageous embodiments are subject matter of the dependent claims.

The present invention is based on the general idea to provide also at least one bypass channel in a generic turbomachine known per se having a turbine arranged in a housing, which bypass extends completely within the housing and bypasses the turbine and which, in particular during a starting phase of the turbomachine, is acted on with working medium until said working medium has reached the desired overheated state required for damage-free operation of the turbine and can then be guided through the turbine. A heat level that is too low can result in insufficient heating of the working medium, specifically during startup of the turbomachine, so that the working medium, for example when entering the stator, is not present in the form of saturated vapor and therefore can cause erosion due to droplet impingement. This is reliably prevented by the bypass channel which, according to the invention, extends within the housing since the working medium can now be guided past the turbine until it has reached its saturated overheated state. Through this arrangement according to the invention of the at least one bypass channel completely within the housing, the latter is heated during the starting phase of the turbomachine by the vapor fed through the at least one bypass channel, as a result of which the turbomachine overall is ready earlier for operation. Due to the fast heating of the housing and therefore also of the stator of the turbomachine, the operating temperature, which lies above the condensation temperature, is reached more quickly than if the bypass channel is decoupled from the housing, as it is always provided in the previous prior art. As soon as the housing temperature is higher than the condensation temperature, the liquid working medium still remaining in the turbine evaporates, wherein due to this active evaporation in the turbine chamber, it can be prevented that liquid working medium is distributed during startup of the turbine in the region of the rotor and consequently can damage the turbine. The turbomachine according to the invention comprising the bypass channel arranged completely within the housing therefore kills two birds with one stone, namely, on the one hand, preventing damage in the turbine caused by droplet impingement and, on the other, quicker reaching of the operating temperature.

Advantageously, heat transfer elements, in particular ribs, for improved heat transfer to the housing are arranged in the bypass channel. Such heat transfer elements increase the surface area within the bypass channel and therefore provide for increased heat transfer from the working medium to the housing or the stator of the turbomachine so that the latter reaches its operating temperature more quickly. Of course, such heat transfer elements can be arranged within the at least one bypass channel in almost any form and shape.

In another advantageous embodiment of the solution according to the invention, a plurality of bypass channels extending substantially parallel are arranged within the housing. Through this, the housing can be heated up uniformly and, in particular, significantly quicker, as a result of which not only more homogenous heating, but also evaporation of the liquid working medium in the turbomachine at various locations and at the same time can be achieved. It is conceivable here that after branching off from a feed channel, the at least one bypass channel splits up in a fan-shaped manner, or that a plurality of bypass channels, each of which can also be connected individually, for example by means of a valve device, can be acted on with hot working medium for heating the housing of the turbomachine.

The present invention is further based on the general idea to use an aforementioned turbomachine in an internal combustion engine having a Rankine cycle and to integrate said turbomachine in said Rankine cycle. An exhaust gas heat exchanger (evaporator) integrated in an exhaust gas flow of the internal combustion engine, a condenser, a reservoir and a pump are also arranged in the Rankine cycle. By using the turbomachine according to the invention having the at least one bypass channel arranged within the housing of the turbine or the turbomachine, damage to the turbine caused by erosion can be prevented and the turbine's service life can thereby be increased. Moreover, reaching the operating temperature of the turbomachine more quickly due to the above described facts is possible. If switching between the bypass mode, in which the working medium is guided through the at least one bypass channel, and the operating mode, in which the working medium is guided through the turbine, takes place in the internal combustion engine according to the invention, this has only little retroactive effect on the cycle as long as bypass channel and turbine have the same properties. This makes it possible to reduce the alternating pressure load for all components, in particular for the exhaust heat exchanger. Since such alternating pressure loads are often the reason for mechanical failure of heat exchangers or exhaust gas heat exchangers, a significant advantage can also be achieved in this manner.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical or similar or functionally identical components.

BRIEF DESCRIPTION OF THE DRAWINGS

In the figures, schematically.

DETAILED DESCRIPTION

Figure 1:
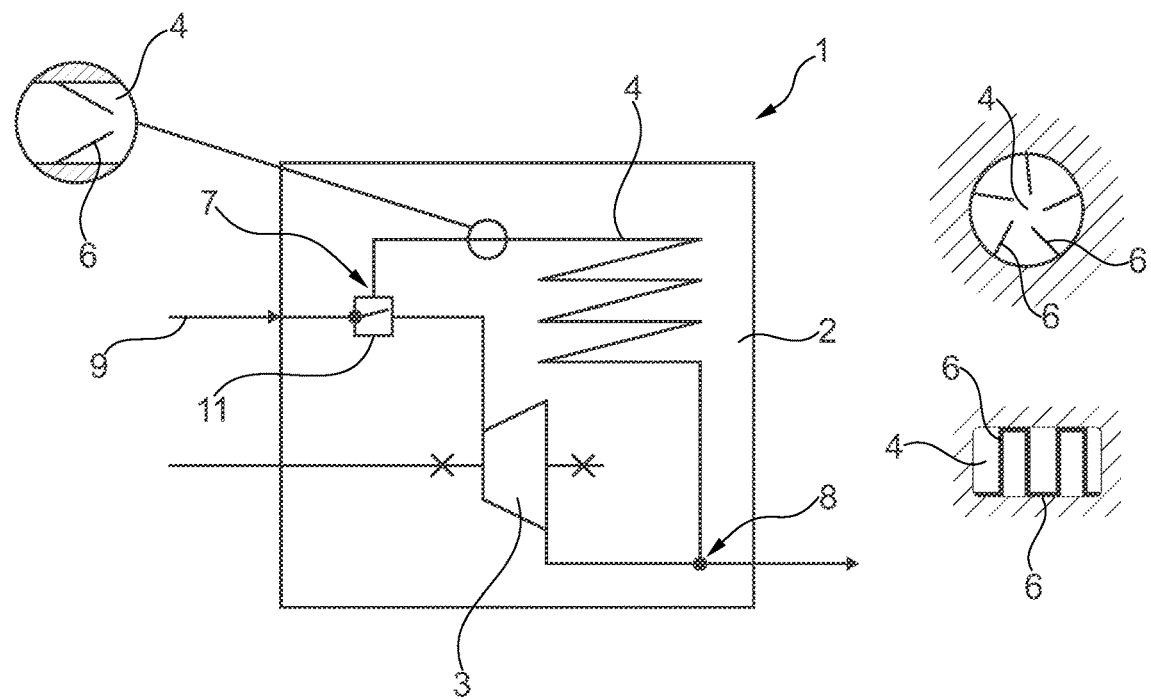
FIG. 1 shows a turbomachine according to the invention.

According to FIG. 1, a turbomachine 1 according to the invention comprises a turbine 3 which is arranged in a housing 2 and can be acted on with hot working medium. According to the invention, at least one bypass channel 4 for heating the housing 2 or the turbine 3 through the working medium is provided, which bypass extends completely within the housing 2 and bypasses the turbine 3. Through this it is possible during a starting phase of an internal combustion engine 5 (cf. FIG. 2), in which sufficient heat quantity has not yet been transferred to the working medium of the Rankine cycle, to first guide the working medium past the turbine 3 and through the bypass channel 4, which bypass channel contributes to the fact that the housing 2 of the turbomachine 1 is heated up more quickly and therefore the turbine 3 is indirectly heated, so that in particular liquid working medium still situated in the region of the turbine 3 evaporates before the turbine is actually acted on with saturated vapor. Through this it is possible to prevent in particular so-called droplet impingement erosion which can result in damage to the turbine 3 and in particular to the rotor blades arranged therein. By more quickly heating of the housing 2, the turbomachine 1 overall can be brought more quickly to its operating temperature, that is, to a temperature above the condensation temperature of the working medium.

For a better heat transfer from the bypass channel 4 to the housing 2, heat transfer elements 6, which can be formed like ribs, for example (cf. cross-sectional illustration on the bottom right in FIG. 1), can be provided in the bypass channel 4. Also, a cross-section of the bypass channel 4 can be selected individually so that the latter can have a round or angular cross-section. It is also conceivable, of course, that a plurality of bypass channels 4 extending substantially parallel are arranged within the housing 2, as is illustrated for the turbomachine 1 according to FIG. 2, for example.

Optionally, at least one separate and heat-insulated bypass channel 4' can also be provided, which also bypasses the turbine 3, but is not or only marginally connected to the housing 2 in a heat-transferring manner. Also, it is not necessary that the bypass channel 4' extends completely within the housing 2. For example, the turbomachine 1 can be designed as an axial impulse turbine. When viewing again the bypass channel 4 according to the FIGS. 1 and 2, it can be seen that the bypass channel is coupled on the inlet side at a first coupling point 7 and on the outlet side at a second coupling point 8 to a line 9, wherein both coupling points 7, 8 are arranged within the housing 2. As an alternative, these coupling points 7, 8 can also be implemented outside of the housing 2. In the line 9, the working medium heated by an exhaust gas heat exchanger 10 (cf. FIG. 2) or generally by an evaporator flows to the turbomachine 1 and/or flows away again therefrom. At the first coupling point 7, a valve device 11 is arranged which, depending on the position, divides a working medium flow among the turbine 3 and/or the at least one bypass channel 4, wherein the valve device 11 is also arranged within the housing 2. Of course, the valve device 11 also enables to redirect the working medium flow completely to the bypass channel 4', which is arranged separate from the other bypass channels 4 and is not connected in a heat-transferring manner to the housing 2 of the turbomachine 1.

Figure 2:
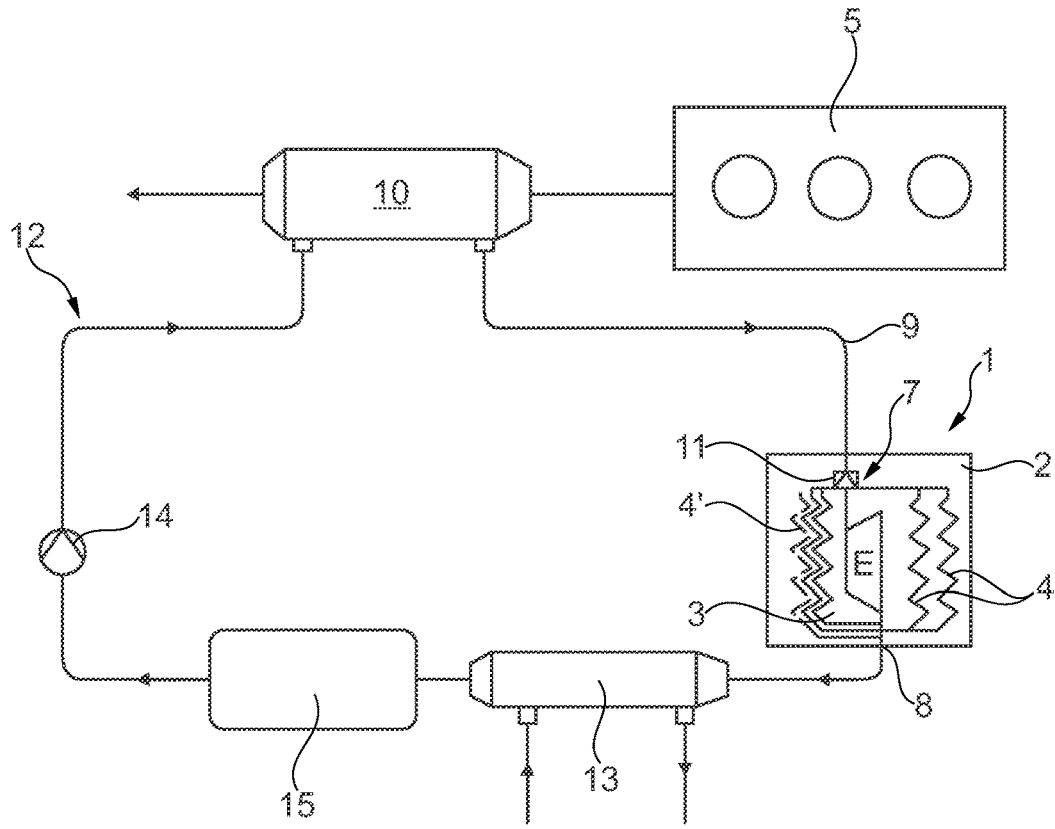
FIG. 2 shows a turbomachine according to the invention, embedded in a Rankine cycle of an internal combustion engine.

When viewing FIG. 2, an internal combustion engine 5 can be seen there which comprises a Rankine cycle 12 in which the above-described turbomachine 1, for example for power generation, is arranged. Furthermore, the exhaust gas heat exchanger 10 connected in a heat-transferring manner to the exhaust gas flow of the internal combustion engine 5, a condenser 13 for the working medium and a pump 14 are also located in the Rankine cycle 12. In addition, a reservoir 15 for the working medium can be provided.

With the turbomachine 1 according to the invention it is possible to not only increase the service life of a turbine 3 significantly since erosion due to insufficiently heated working medium is no longer a concern, but it is also possible to use the turbomachine 1 earlier because via the at least one bypass channel 4, which is arranged completely within the housing 2, rapid heating of the housing 2 and the turbine 3 is possible.

The invention claimed is:

1. A turbomachine, comprising:
a housing surrounding a turbine chamber;
a turbine arranged in the turbine chamber of the housing and configured to be acted on with a working medium;
a flow duct coupled to the turbine for conveying the working medium, the flow duct including an upstream duct portion for feeding the working medium to the turbine and a downstream duct portion for discharging the working medium from the turbine;
at least one bypass channel configured to heat the housing by transferring heat from the working medium to the housing, the at least one bypass channel structured and arranged to extend completely within the housing and guide the working medium around the turbine, wherein an inlet side of the at least one bypass channel is connected to the upstream duct portion at a first coupling point and an outlet side of the at least one bypass channel is connected to the downstream duct portion at a second coupling point;
at least one heat-insulated bypass channel extending at least partially in the housing and configured to bypass the turbine, the at least heat-insulated bypass channel configured to minimize heat transfer of the working medium to the housing;
a valve device disposed at the first coupling point and configured to divide a flow of the working medium among the turbine, the at least one bypass channel, and the at least one heat-insulated bypass channel, wherein the valve device is structured and arranged to redirect the flow of the working medium completely to the at least one bypass channel in a bypass mode;
at least one heat transfer element arranged in the at least one bypass channel to facilitate heat transfer to the housing, wherein the at least one heat transfer element includes ribs distributed circumferentially to one another about an interior surface of the at least one bypass channel and projecting radially towards a center of the at least one bypass channel with respect to a flow direction of the working medium flowing therethrough to facilitate heating the housing to an operating temperature greater than a condensation temperature of the working medium when the valve device is in the bypass mode; and
wherein the at least one bypass channel includes a plurality of bypass channels arranged separate from one another at various locations about the housing and structured to guide the working medium past the turbine, and wherein the plurality of bypass channels extend parallel to one another within the housing between the first coupling point and the second coupling point.

2. The turbomachine according to claim 1, wherein the turbine is an axial impulse turbine.

3. The turbomachine according to claim 1, wherein the first coupling point connected to the inlet side of the at least one bypass channel is arranged within the housing upstream of the turbine and the second coupling point connected to the outlet side of the at least one bypass channel is arranged within the housing downstream of the turbine.

4. The turbomachine according to claim 1, the valve device is switchable between the bypass mode and an operating mode where the valve device directs the working medium to the turbine.

5. The turbomachine according to claim 1, wherein the working medium is a phase change fluid according to the Clausius-Rankine cycle.

6. The turbomachine according to claim 1, wherein the valve device is structured and arranged to redirect the flow of the working medium completely to the at least one heat-insulated bypass channel.

7. An internal combustion engine, comprising:
a Clausius-Rankine cycle including a turbomachine integrated therein via a line that conveys a working medium, an exhaust gas heat exchanger operatively connected in a heat-transferring manner to an exhaust gas flow, a condenser, a reservoir for the working medium, and a pump integrated therein via the line, the turbomachine including:
a housing surrounding a turbine chamber and provided with an inlet for supplying the working medium to the turbomachine and an outlet for discharging the working medium from the turbomachine;
a turbine arranged in the turbine chamber of the housing and operatively connected to the line, the turbine configured to interact with the working medium conveyed in the line;
at least one bypass channel configured to heat the housing by transferring heat from the working medium to the housing, an inlet side of the at least one bypass channel coupled to the line at a first coupling point disposed upstream of the turbine and an outlet side of the at least one bypass channel coupled to the line at a second coupling point disposed downstream the turbine, wherein the at least one bypass channel is structured and arranged to extend within the housing and guide the working medium around the turbine from the first coupling point to the second coupling point to bypass the turbine;
at least one heat-insulated bypass channel structured and arranged to extend at least partially in the housing and bypass the turbine separate from the at least one bypass channel, the at least one heat-insulated bypass channel configured to minimize heat transfer of the working fluid to the housing;
a valve device arranged at the first coupling point configured to divide a flow of the working medium among the turbine and the at least one bypass channel, the valve device switchable between an operating mode where the flow of the working medium is guided from the exhaust gas heat exchanger through the turbine, and a bypass mode where the flow of the working medium is guided from the exhaust gas heat exchanger through the at least one bypass channel and past the turbine towards the condenser arranged downstream of the turbomachine; and
wherein the valve device is structured to switch into a position that redirects the flow of the working medium completely to the at least one heat-insulated bypass channel.

8. The internal combustion engine according to claim 7, wherein the turbomachine is arranged in the Clausius-Rankine cycle between the exhaust gas heat exchanger and the condenser, and the exhaust gas heat exchanger is arranged upstream of the turbomachine and downstream of the pump.

9. The internal combustion engine according to claim 7, wherein at least one of the first coupling point and the valve device is disposed within the housing.

10. The internal combustion engine according to claim 7, wherein the valve device is structured and arranged to redirect the flow of the working medium completely to the at least one bypass channel in the bypass mode.

11. The internal combustion engine according to claim 7, wherein the at least one bypass channel includes at least one heat transfer element to facilitate heat transfer of the working medium to the housing, the at least one heat transfer element including ribs distributed circumferentially to one another about an interior surface of the at least one bypass channel and projecting radially towards a center of the at least one bypass channel with respect to a flow direction of the working medium flowing therethrough to facilitate heating the housing to an operating temperature above a condensation temperature of the working medium.

12. The internal combustion engine according to claim 7, wherein the at least one bypass channel includes a plurality of bypass channels arranged separate from one another at various locations about the housing and structured to extend parallel to one another within the housing between the first coupling point and the second coupling point.

13. The internal combustion engine according to claim 12, wherein the at least one bypass channel is connected to the valve device and splits up into the plurality of bypass channels downstream of the valve device.

14. The internal combustion engine according to claim 7, wherein the valve device is structured and arranged to direct the working medium completely to the at least one bypass channel when a temperature of the working medium of the Clausius-Rankine cycle flowing to the turbomachine is below a predefined temperature corresponding to a saturated vapor state of the working medium.

* * * * *